US008083594B2

(12) United States Patent
Schreiber

(10) Patent No.: US 8,083,594 B2
(45) **Date of Patent: *Dec. 27, 2011**

(54) SERVICE ENHANCING POWER SUPPLY SYSTEM FOR GAMING MACHINES

(75) Inventor: Charles T Schreiber, Reno, NV (US)

(73) Assignee: Bally Gaming Systems, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/965,717

(22) Filed: Dec. 10, 2010

(65) Prior Publication Data

US 2011/0081974 A1 Apr. 7, 2011

Related U.S. Application Data

(63) Continuation of application No. 10/657,450, filed on Sep. 8, 2003, now Pat. No. 7,862,435.

(51) Int. Cl.
*A63F 9/24* (2006.01)
*A63F 13/00* (2006.01)

(52) U.S. Cl. ................. 463/46; 463/1; 463/47; 361/679

(58) Field of Classification Search ........... 463/1, 46–47
See application file for complete search history.

(56) References Cited

U.S. PATENT DOCUMENTS 5,694,335 A * 12/1997 Hollenberg ..................... 726/16
5,795,229 A * 8/1998 Johnson .......................... 463/47
6,773,348 B2 * 8/2004 Stockdale ....................... 463/29

* cited by examiner

*Primary Examiner* — Dmitry Suhol
*Assistant Examiner* — Ryan Hsu
(74) *Attorney, Agent, or Firm* — David N. Caracappa

(57) ABSTRACT

A gaming machine having a multi-tiered power supply and power distribution system which enables maintenance of low security and higher failure rate components such as video monitors, LCDs, or reel mechanisms without disconnecting power from higher security, low failure rate components such as the main processor board. The ability to provide multi-tiered power in this manner allows low security risk items to be serviced while the gaming machine is still in contact with the casino's backend reporting system, reporting on its status. This improves security, accountability of maintenance personnel, and significantly reduces overall gaming machine down time.

6 Claims, 5 Drawing Sheets

Prior Art Gaming Machine
With Single Switched Power Supply

Service Enhancing Power Switching

Method Of Using A Tiered Power Supply In A Gaming Machine

High Voltage/Low Voltage Service Enhancing Power Switching

Gaming Machine
With Tiered Power Supply

SERVICE ENHANCING POWER SUPPLY SYSTEM FOR GAMING MACHINES

RELATED APPLICATIONS

This application claims priority from provisional application Ser. No. 60/410,183 filed on Sep. 11, 2002 and from provisional application Ser. No. 60/421,161 filed on Oct. 25, 2002. Application Ser. Nos. 60/410,183 and 60/421,161 are hereby incorporated herein by reference.

BACKGROUND OF THE INVENTION

1. Field of the Invention

This invention pertains generally to gaming machines. More particularly, the present invention discloses a method and apparatus for providing gaming machines with a multi-tiered or selectable power supply that enables substantial time-savings when a gaming machine is undergoing maintenance.

2. The Prior Art

Gaming machines having a single power switch are well known. An example of a slant-top style gaming machine is shown in FIG. 1. A typical gaming machine 100 has a top candle 102, a glass art area 104, bill acceptor 106 (shown in two typical locations), reel display area 108, reel panel 110, and player input devices (usually buttons) 112. In addition, inside a prior art gaming machine (cut-through circle 114) are the game logic components 116, comprising a main processor board and connections, and a power supply 118. When the game machine is opened for service, there is a single power switch which turns off all the power to the game machine. This requires the game machine to re-boot once power is turned back on.

As game machine logic has become more complex, now comprising a full-featured OS such as Linux or Microsoft's NT® as well as the gaming applications, the time required for cold-start reboots has become significant (over 2 minutes). If any game configuration must be carried out, that time must be added on top of the re-boot time. This can be especially aggravating to casinos and their patrons when the power must be shut of for a minor field repair.

Thus, there is a need to create better solutions for dealing with power and re-boot when gaming machines need minor on-site upgrades and/or repair (such as burnt-out displays, bulbs, fluorescents, etc.).

BRIEF DESCRIPTION OF THE INVENTION

The present invention is a new power supply and power distribution system in a gaming machine that allows a subset of the components inside a gaming machine to be powered down, while allowing a smaller subset of components to remain powered up. The power supply and distribution system of the present invention resides inside a game cabinet, typically having a 110 v wire and plug used to connect to an external (to the gaming machine) power source. Inside the game cabinet are the components that make up gaming machines, including but not limited to the main processor board, wiring harnesses, coin and bill handlers, player's card readers, LCD display, video display or reel display, network connection board or interface from the main processor board, back lighting, etc. Gaming cabinets typically have at least one (often only one) lockable access panel (or door) that can be opened from the front of a game machine. In the present invention, opening the access panel allows a person access to a main power switch, which will is expected to be configured as part of the main power supply (but may be a separable power distribution switch). It is intended that this switch be the only one available or easily available at this point. The repair person switches the switch to the off position, and can then make any needed repairs to the components that have been switched off (typically the video monitor and various lights and buttons as well as other low security higher maintenance player interface devices). What this actually does is leave the main processor board powered up, coupled with some switches (i.e., "door open" detectors) and perhaps a few other components. This allows the main processor board not be powered down and rebooted to do maintenance on the low security, higher frequency maintenance items. This also allows the gaming machine to remain in contact with a back-end machine in the casino, reporting on its status as repairs are carried out.

The second set of components that stays powered up may have a secondary power distribution switch that enables them to be powered down, with access to the secondary switch preferably having another level of access restraint (an additional lockable access panel, door, gate, bar, etc.). This allows lower level maintenance personnel to have access to the lower security level components in a gaming machine, while requiring a second key or access code to get to the secondary power switch and its associated higher security level components.

The secondary power switch may be a part of a second power supply, which supplies low voltage power to the set of switches and electronics that stays powered up during normal machine maintenance. This is not necessary, however. For example, the primary power supply could supply both high and low voltage power, with the switches controlling distribution channels (connection points on a bus bar and similar configurations, where the switches control power to one or more of the bus bars). Any configuration of power supplies and connection points allowing a plurality of selectable on-off connections is contemplated by the present invention.

DESCRIPTION OF THE INVENTION

Figure 1:
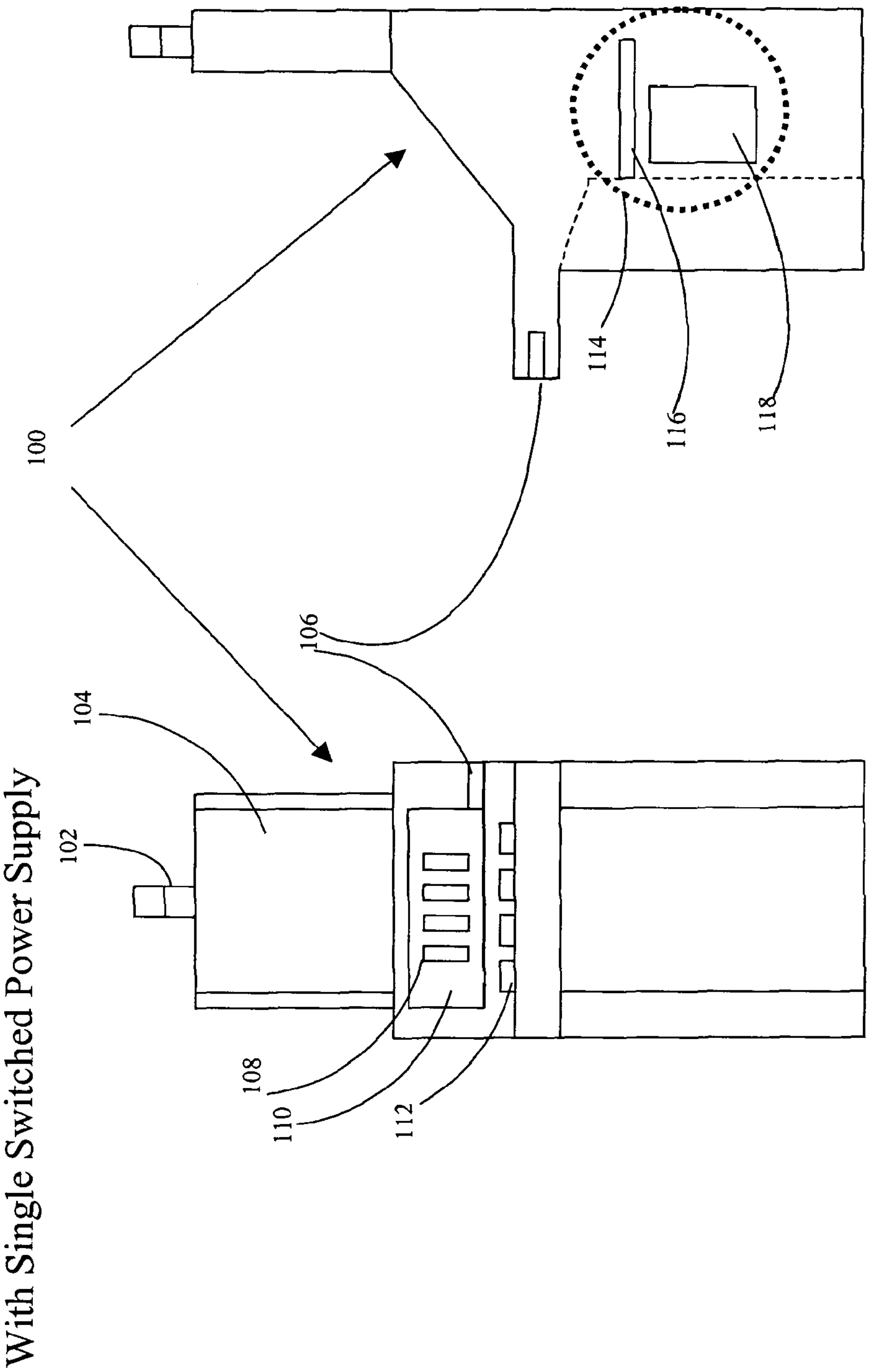
FIG. 1 is an illustration of a prior art gaming machine.

Persons of ordinary skill in the art and with the benefit of the present disclosure will realize that the following description of the present invention is illustrative only, and is not limiting. Other embodiments of the invention will readily suggest themselves when such skilled persons have the benefit of the present disclosure.

Referring to the drawings, for illustrative purposes the present invention is shown embodied in FIGS. 2-5. It will be appreciated that the apparatus may vary as to configuration and as to details of the parts without departing from the inventive concepts disclosed herein. The methods may vary as to details, partitioning, repetition, step inclusion, and the order of the acts, without departing from the inventive concepts disclosed herein.

Figure 2:
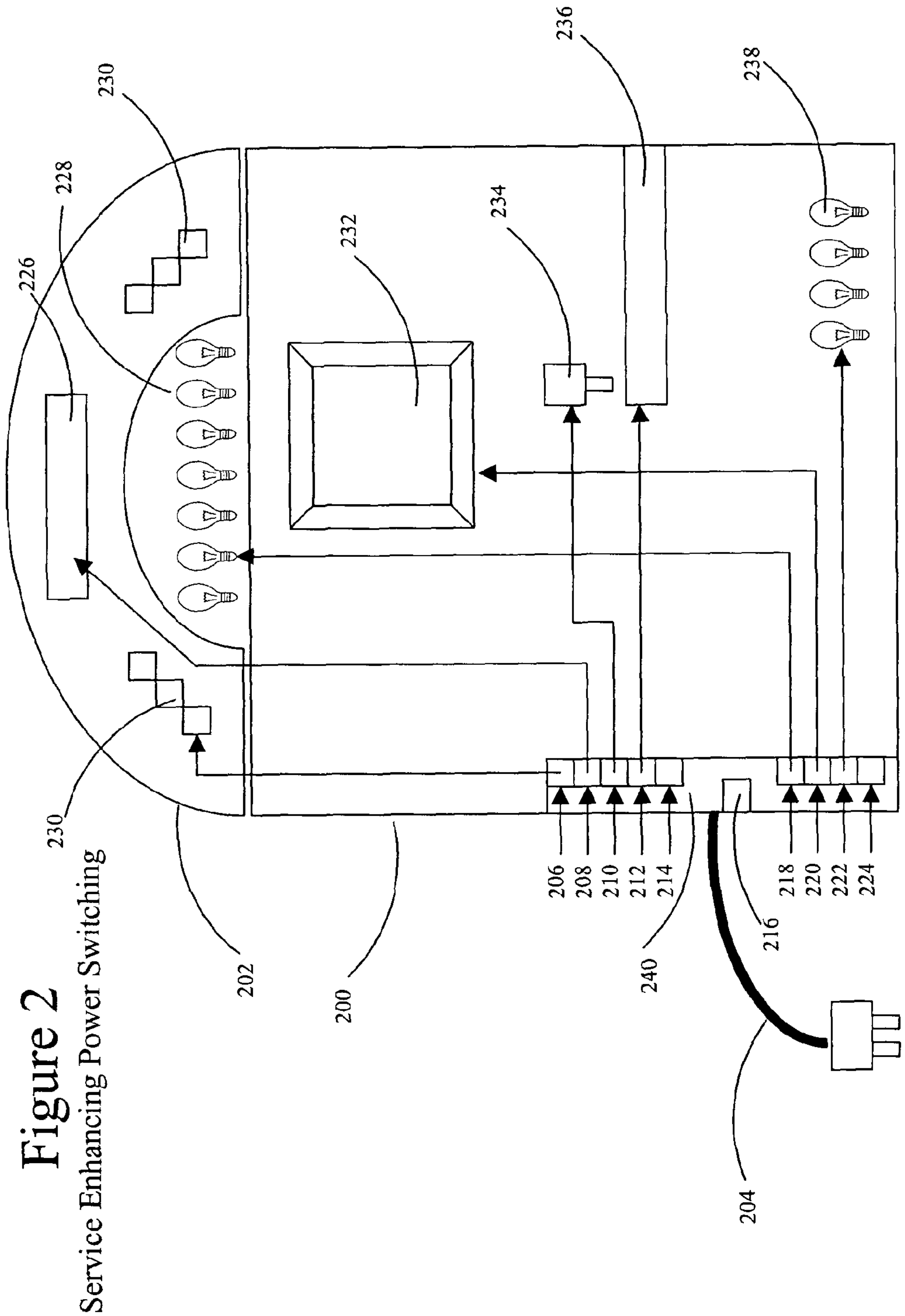
FIG. 2 is a block diagram of a gaming device power supply according to the present invention.

One embodiment of the present invention is shown in FIG. 2. Shown is gaming machine 200 having top box 202 and primary power cord 204. Primary power cord 204 is connected directly to the primary power supply/distribution box (PS-D-box) 240. PS-D-box 240 has a primary power-down or "Off" switch 216. All the connections shown in FIG. 2 below power-down switch 216 are called switched primary power sources, or simply switched power. The connections above power-down switch 216 are called un-switched primary power sources or simply un-switched power. When a person opens the game cabinet and turns the main power supply switch to "Off", the switched power sources are disconnected and the un-switched sources stay live.

Shown in this exemplar is switched power going through connection 218 to the main lighting 228 in top box 202 (for simplicity of illustration incandescent bulbs are shown; this applies to any lighting or other peripheral connected to a switched power connector). Switched power from connection 220 goes to the monitor and its power supply 232. Switched power from 222 goes to lighting in the main cabinet (as stated above, the incandescent bulbs are shown for illustrative purposes; any lighting or other peripheral connected to switched power is included hereby). Further shown is unpopulated connection 224. One the advantages of the present invention is that the connectors in PS-D-box 240 are industry standard connectors. This enables later added peripherals to be switched or un-switched depending on where they are connected, and further enables certain components to be swapped from switched to un-switched or vice-versa. For example top box lights 228 could be made un-switched, if so desired, by reconfiguring the connection points on PS-D-box 216.

Connection point 206 is shown as an un-switched connection to a set of display LEDs 230 in top box 202. Connection point 208 is shown powering a flat panel display 226 in top box 202. Connection point 210 provides un-switched power to a set of switches (such as door-open switches, cash box switches, printer paper state switches, etc.) 234, and connection point 212 provides un-switched power to the logic components (usually the main processor board but may include several logic boards, especially in a game having a main processor board and at least one other controller board located away from the main processor board) and their power supply 236 of game machine 200.

Finally, connection point 214 is shown as an unpopulated connection point. As with unpopulated connection point 224, this may be used for a future addition to the gaming machine or may be used to reconfigure the components that are switched and un-switched (those that are enabled to be changed; some will not be changeable). Also note this is illustrative as to numbers: any number of unpopulated connectors for switched and un-switched connections may be provided as designs dictate.

The power distribution and switching of the present invention enables significantly easier servicing while the game is in use in the field. When a service person opens the main cabinet door for servicing and flips the switched-power or main power switch to "Off", anything powered by connections below switch 216 is shut off. This enables servicing of the typical high-maintenance items such as the video monitor (CRT, flat panel, etc.), primary or high intensity level lights (110V in the US), or other peripherals without shutting down the game logic and other important switches and indicators.

Figure 4:
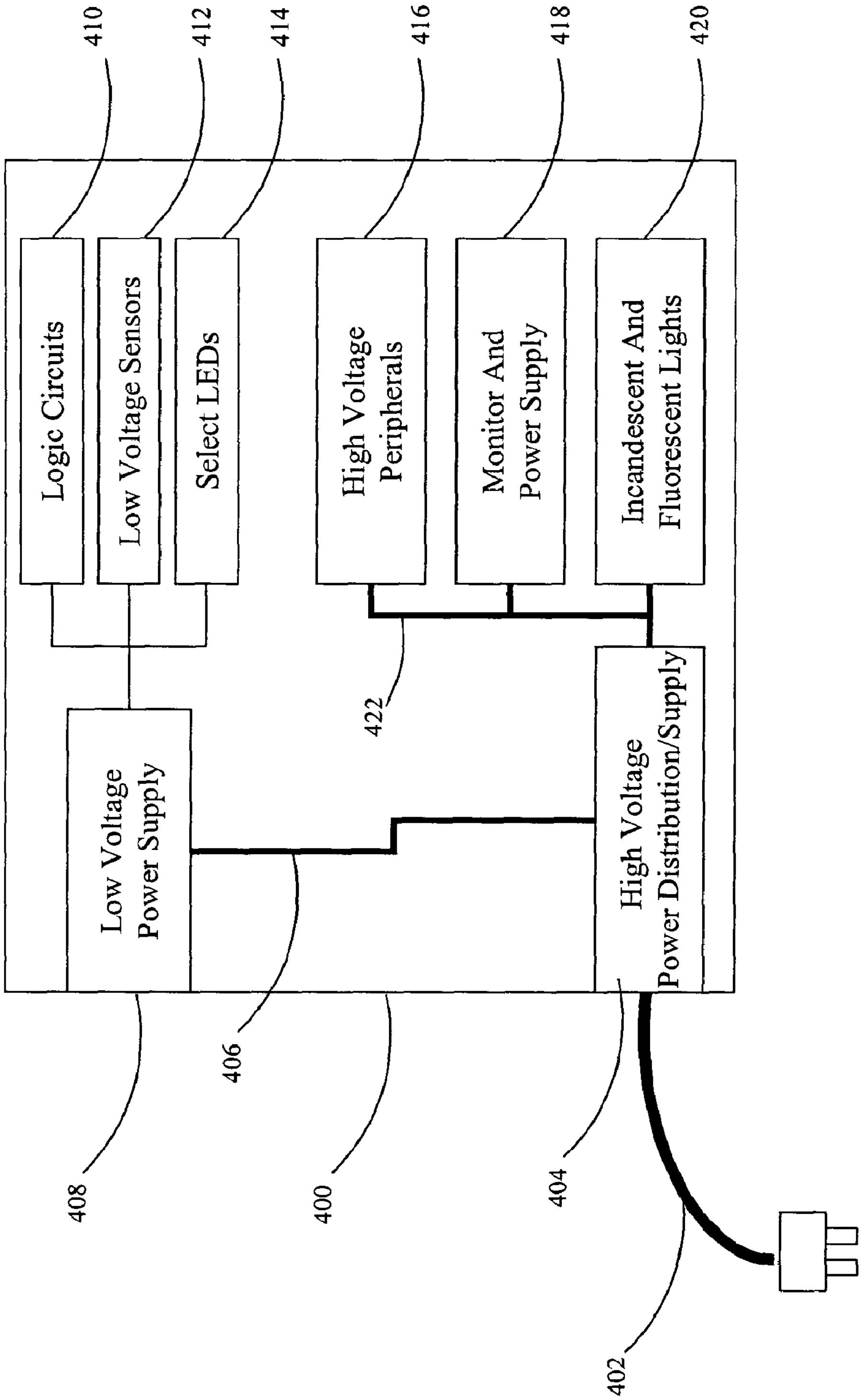
FIG. 4 is a block diagram of another gaming device power supply according to the present invention.

A further embodiment of the present invention is shown in FIG. 4. Shown is gaming machine 400 having power cord 402 connected to a high voltage power supply and distribution box 404. A pass-through connection is also made to low voltage power supply 408. Alternatively, pass-through connection 406 may be connected via plugs (any electrically conductive plug and receptacle or other connection/disconnection means such as knife switches, removable blade connectors, etc.) on both ends to facilitate servicing. In a preferred embodiment, high voltage distribution box 404, connection 406, and low voltage power supply 408 are packaged physically next to each other so that an on-floor service person cannot physically touch connection 406 unless power distribution box 404 is going to be removed.

Low voltage power supply 408 supplies voltage (typically 12 v or less; often 3 or 5 v) to logic circuits (typically a processor board, but may further include an I/O board or other logic) 410, low voltage sensors and switches 412 such as door-open open and player contact buttons, and select LEDs. High voltage power supply and distribution box 404 supplies power to the monitor and its power supply (typically different than the main power supply) 418, any 110 v lights 420, and any other peripheral 416 which uses more than (typically) 12 v or has a large amperage draw.

When a service person opens the main cabinet door for servicing the game machine and flips the main power switch, anything powered by high power lines 422 are shut off. This enables servicing of the typical high-maintenance items such as the monitor, 110V lights, or other 110V peripherals without shutting down the low voltage game logic and a few select low voltage switches and indicators. This prevents shock hazard while leaving the machine logic functioning. This is one configuration of the general configuration described above, having a safety orientation due to the high/low voltage tiered power supply.

Note that FIGS. 2 and 4 is illustrative, not showing more complex embodiments of the present invention in order to preserve clarity in the figure. For example, a plurality of switches may be provided in a tiered arrangement, where a first power switch powers down components available for servicing when a main door to the interior of the game cabinet is opened. This would typically be for high maintenance and low security components like video displays, buttons, lighting, and similar game mechanisms. A next tier would be a power switch that is accessible when an access door located inside the game cabinet is opened (may or may not be separately locked, but in a preferred embodiment will be separately lockable at the choice of the casino). Upon opening the interior access means, the game tech or money handler will throw the power switch that shuts power down to the mechanisms serviceable within the interior chamber, but leaves at least the main processor board powered up. Finally, if the main processor board itself needs servicing, then a different interior compartment is accessed (again, preferably having a separately keyed access strap, door, grate, bar, etc., locked at the discretion of the casino) and a final power switch is turned off, powering down the main processor board. The main processor board may now be serviced, and the gaming machine can now no longer communicate with a backend computer. Until the last tier is powered down, the gaming machine can still communicate its status to a backend computer for monitoring purposes.

Figure 5:
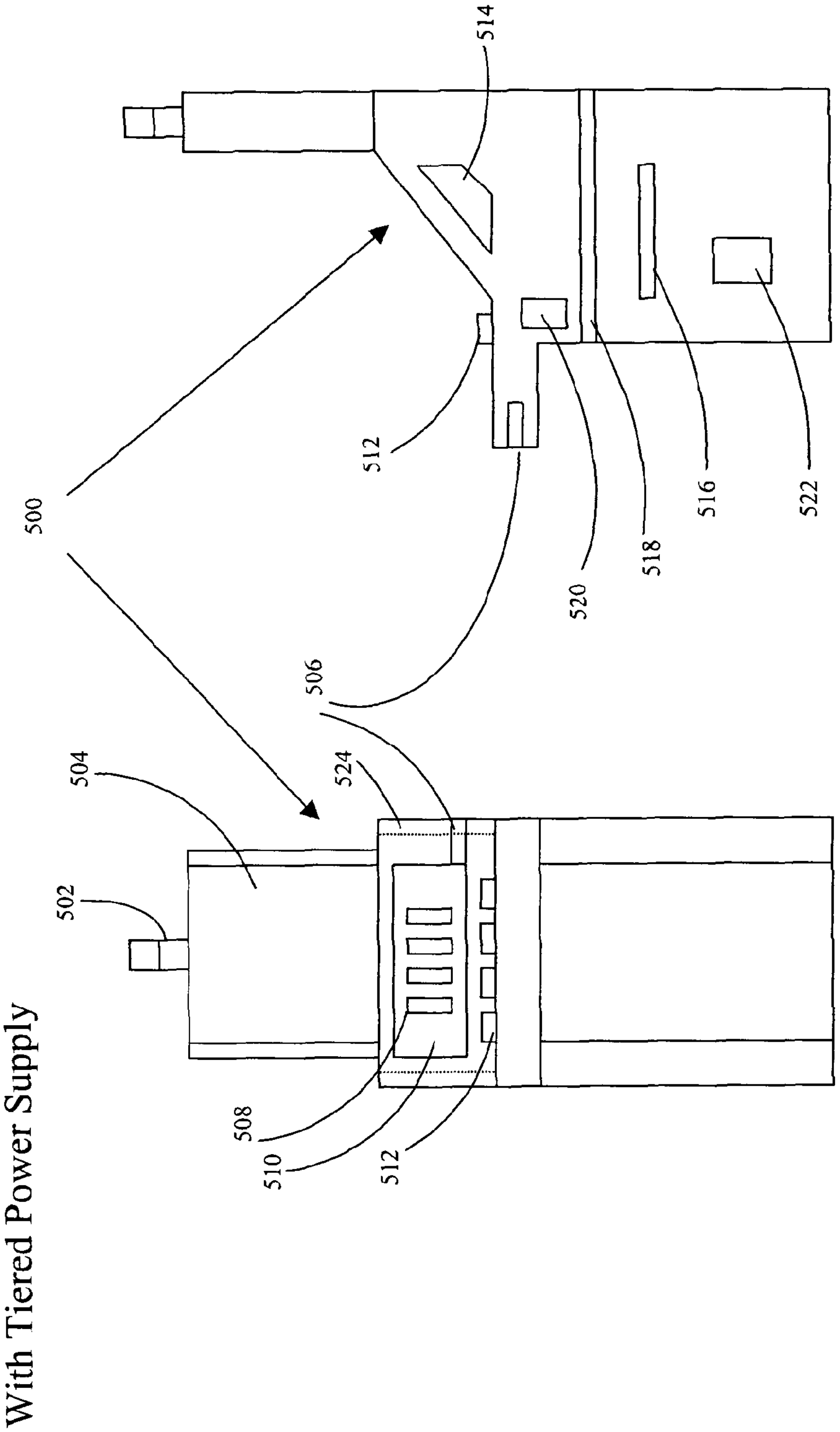
FIG. 5 is a block diagram of a gaming machine and power supply with enhanced internal access control according to the present invention.

FIG. 5 illustrates a two-tiered power supply in a gaming machine according to the present invention. Shown is a slant-top style gaming machine 500 having top candle 502, a glass art area 504, bill acceptor 506 (shown in two typical locations), reel display area 508, reel panel 510, and player input devices (usually buttons) 512. Also shown in dotted lines is the location of service access door 524. Opening access door 524 allows access to tiered power supply 520, which a service person will shut off. This will turn off the switched AC power, allowing servicing of items like player buttons 512, video monitor or reel mechanisms 514, bill acceptor 506 (in a preferred embodiment will not simultaneously allow access to the bill storage area), candle 502, and similar game machine components. If the game logic board (main processor board) needs servicing, then an additional access panel 518 has to be opened (in one preferred embodiment, will be separately lockable from the main access panel that has already been opened) to gain access to main processor board 516 and secondary (second tier) switch 522. Note that the actual composition of second tier switch 522 will depend on the particular embodiment of the game machine. For example, second tier switch 522 may also be a low voltage power supply and switch, just a second tier switch, and may further include a series of second tier power connection points for other game components accessible after a service person gains access to this second tier service area and second tier power supply/switch. If a service person turns off the second tier switch or power supply, then the game machine logic is now off and cannot communicate with any backend systems. Under normal use, this is a far rarer occurrence than accessing and servicing the components accessible through the first (external) access panel.

Figure 3:
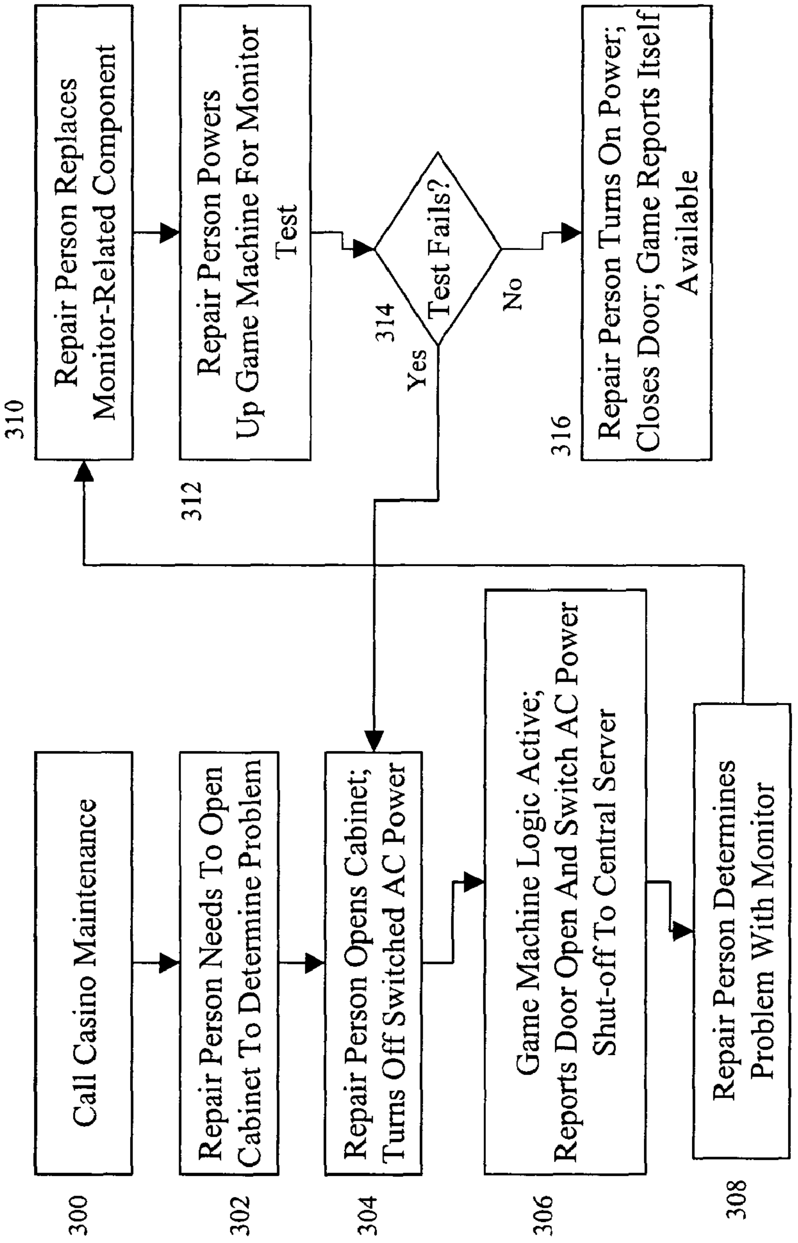
FIG. 3 is a flow chart showing one example of service use according to the present invention.

Describing FIG. 3, shown is a method of using the two-tiered power supply of the present invention in a gaming machine. Box 300 corresponds to a call being placed for casino maintenance due to a game problem. Box 302 is entered, corresponding to the maintenance person determining that the game cabinet door will need to be opened to resolve the problem. Continuing with box 304, the person opens the cabinet door and flips the main power switch off. All high voltage or first tier servable game machine components (depending on how the gaming machine was designed) are now off in the cabinet. Continuing with box 306, the game logic is still active; it sends a message to a central server that its external access door is open and associated power is shut off. Casino management has the opportunity to check that the game machine reporting the physical intrusion is one due for maintenance; if not, a security check may be done (camera scan, sending a security person to the machine reporting an open door, etc.). Continuing with box 308, the repair person does some checks and decides some portion of the monitor circuitry as at fault. Box 310 corresponds to the repair person replacing a monitor component or the monitor itself. Note that this is an example; any first tier game machine component can be serviced in this manner. Box 312 corresponds to the repair person powering up the monitor by switching the main power on (alternatively, powering up any component that is switched off by use of the switched AC power or first tier-power switch). There is no need to boot the system to check the monitor or other serviced component. If the monitor or other component is working, it will be apparent as soon as the switched AC power (or first tier power, depending on the gaming machine) is turned back on. No waiting!

Decision diamond 314 is now entered. If the test made after switch-on fails, the “Yes” exit is taken to box 304, where the repair cycle starts again. For each test and repair cycle, the repair person saves the time of a reboot and the gaming machine can report its status to a central or backend system for monitoring purposes. This is a significant time saver and logistical help to the casino. When the repair finally shows a fixed machine, the “No” exit is taken from diamond 314 to box 316. The repair person locks up the machine and it is ready to play.

Accordingly, it will be seen that this invention provides a system and method for greatly enhanced servicing and remote monitoring of gaming machines during service. Although the description above contains much specificity, the description should not be construed as limiting the scope of the invention; the descriptions given are providing illustrations of embodiments of the inventive concepts. The scope of this invention is determined by the appended claims and their legal equivalents.

The invention claimed is:

1. A gaming machine, comprising:

a game cabinet configured to house a game processor and a first game peripheral allowing play of at least one game;

a first power supply located within the gaming cabinet, the first power supply operably connectable to an external power source, wherein the first power supply includes switched and unswitched connections, wherein the first game peripheral is coupled to the switched connection and a second power supply is coupled to the unswitched connection wherein the game processor is coupled to the second power supply, and wherein the first game component is electrically isolated from the first power supply when the first power supply is turned off and the second power supply and the game processor remain electrically connected to the first power supply;

a first lockable external access panel configured to only allow access to the switched connections; and a second lockable access panel located within the gaming cabinet, the second lockable access panel configured to only allow access to the unswitched connections.

2. The gaming machine of claim 1 where said second power supply is located in said gaming machine such that said first lockable external access panel must be opened to gain access to the second lockable access panel and said second lockable access panel must be opened to gain access to said second power supply.

3. The gaming machine of claim 1 where said second power supply comprises a low voltage power supply operably connected to a main processor board comprising the game processor using one of a plurality of connection points.

4. The gaming machine of claim 1 where said second power supply further comprises a switch having an off position configured to electrically disconnect said plurality of connection points on said second power supply.

5. The gaming machine of claim 1 where said first power supply further comprises a plurality of power distribution points, each point being operable for electrically connecting to gaming machine components.

6. The gaming machine of claim 1 where said first power supply further comprises a switch having an off position, and a plurality of high voltage connection points and a plurality of low voltage connection points, where at least one of said points is electrically disconnected when said switch is in said off position.

* * * * *